Patented Aug. 29, 1944

2,356,965

UNITED STATES PATENT OFFICE 2,356,965

METHOD OF MAKING ABRASIVE ARTICLES

Hugh V. Allison, Fairfield, Conn., assignor to The Allison Company, Bridgeport, Conn., a corporation of Connecticut No Drawing. Application May 12, 1943,
Serial No. 486,747

6 Claims. (Cl. 51—299)

This invention relates to new and useful improvements in methods of manufacture and has particular relation to methods of making abrasive articles.

The present invention provides an improved method whereby grinding wheels and abrasive cutting wheels and other abrasive articles of the organic bonded type may be manufactured according to practical or commercial requirements with a bond of that synthetic elastomer which comprises the copolymer of styrene and butadiene.

It is realized that the use of this particular copolymer as a binder in the abrasive art is not basically new. However, as will clearly appear from the following description the methods herein disclosed for the processing of this particular copolymer to adapt it for the herein specified uses are new and a distinct advance in the abrasive art.

Depending on the bond used in their manufacture organic bonded abrasive wheels may be classified under two general headings. The rubber bonded type of abrasive wheel (under which is included natural rubber and its latex along with various synthetic elastomers and their latices) is herein considered as comprising type 1 while the resinoid bonded type (under which I include those wheels bonded with either or both of natural and synthetic resins) is herein considered as type 2. Between these two types of organic bonded wheels is a third type which may be designated as the rubber-resinoid type of bonded wheel. Wheels of this third type follow most closely the properties of the either of the first two types depending on which of the rubber or resin predominates in the mixture comprising the bond.

The present invention relates to the first and third types of bonded abrasive articles, that is, to the rubber bonded type and to the rubber-resinoid type. According to the present invention abrasive wheels or other abrasive articles may be made by either of the two classical basic methods heretofore employed in the art. The present invention may be practiced using the basic roll mixing and calendering method and also by the fluid press method in which the abrasive and bond are first mixed in a paddle or dough type mixer and then molded to the desired shape and cured.

The present invention makes possible the application to the copolymers of butadiene and styrene of the methods disclosed in my copending application Serial Number 443,460, filed May 18th, 1942, and in such application applied to the manufacture of abrasive articles bonded with the copolymer of butadiene and acrylic nitrile.

Heretofore in the abrasive art great difficulty has been experienced in processing synthetic elastomers by the roll mixing method owing to the fact that these elastomers, and especially the copolymer of butadiene and styrene, have little tack. The characteristic of tackiness is essential in the elastomer if the abrasive is to be properly held. The present invention provides for the overcoming of this lack of tackiness in the copolymer of butadiene and styrene whereby abrasive articles may be made using such copolymer as a bonding agent, as readily as when natural rubber is used.

While the copolymers of butadiene and styrene have the fault of possessing little tack, for processing purposes they have the advantage, as will appear in detail, of being capable of being dissolved by solvents which may be later cured into the finished product or articles thereby avoiding the necessity for any step looking to the removal of such solvents from the articles or product and without harmful effects to the articles. This makes the copolymer of butadiene and styrene very useful in the pressed process of manufacture of abrasive articles when the present invention is used in practicing such basic process.

In my copending application above identified the copolymer of butadiene and acrylic nitrile is utilized in the pressed and fluid rubber processes and the solvents disclosed are kept in the finished articles with beneficial effect. However, a different type of solvent from that herein employed is used in the process of said copending application. Solvents for the copolymer of butadiene and acrylic nitrile are not useful to the best advantage with the copolymer of butadiene and styrene and vice versa. However, according to the present invention the present solvent is retained in the cured article as in the matter of said copending application.

In my Patent 2,248,031 of July 1, 1941, I disclose a method in which rubber is dissolved in a solvent which is beneficially retained in the finished abrasive article. However, in that patent the solvent is reacted with an added agent, namely, with an alpha beta unsaturated chemical, to form a heteropolymer. This addition of the agent to react with the solvent and form a heteropolymer is necessary in the case of a natural rubber bond.

In the present case an agent may be added to react with the synthetic elastomer comprising the copolymer of butadiene and styrene as will later be set forth. However, in the present case wherein I propose to use the copolymer of butadiene and styrene as the abrasive bond I have found that using the present softener or solvent no reactive chemical need be added in order that a satisfactory bond be formed.

According to the present method the copolymer of butadiene and styrene is plasticized, softened or dissolved by the addition thereto of styrene. This added styrene may be in various stages of polymerization but I prefer it in monomeric form. In the roll mix process styrene in powdered form may be used to produce tack. However, in the fluid process styrene in the solid form is less useful. In general, as the degree of polymerization of the added styrene advances the styrene is less useful in the present case because the styrene has less solvent power and produces less tack. Thus while I can use styrene in the dimer, trimer and other stages I prefer it in the monomeric form. The amount or proportion of the styrene added depends on the basic process to be used (roll mix or press method) on the degree of polymerization of the styrene added and on the hardness of the resultant bond desired. The hardness of the bond is also controllable to some degree by the extent and method of cure of the articles being made.

When the synthetic elastomer comprising the copolymer of butadiene and styrene is dissolved, plasticized or softened by the addition of styrene and the result mixed with abrasive grain, vulcanizing agents, fillers, etc., and the mix shaped (by molding, sheeting, or the like) and cured the said styrene further polymerizes and with the copolymer forms a thermoplastic bond varying in hardness according to the amount of styrene used and the cure employed. This is the essential difference between the use of styrene in the copolymer of butadiene and styrene and its use in natural rubber. The use of styrene with natural rubber in the making of a rubber bonded abrasive article requires that a reaction chemical be added to form a heteropolymer if the best results are to be obtained or that such styrene be in some manner removed from the mix before or during final cure of the bond.

The carrying out of the present invention may be best disclosed by dividing it into two separate parts according to the basic method employed, i. e., the roll mix and the press methods. First the practice of the present method according to the basic roll mix method will be set forth and then the method of the invention will be described as incorporate in the fluid or press type of method of manufacturing organic bonded abrasive articles.

I have discovered that the copolymer of butadiene and styrene can be very readily used in the manufacture of abrasive articles by the roll mix process if a small quantity of liquid styrene (1 to 10 percent) B. P. 143 C is first compounded into the synthetic elastomer. As above pointed out styrene in various stages of polymerization may be used in this basic process. The small quantity of the liquid styrene gives to the elastomer the tack so necessary for the successful practice of the roll mix method and which has heretofore been lacking in the mentioned elastomer.

The addition of the styrene may best be carried out during breaking down of the elastomer on a mill. However, it is to be understood that I am not limited to the adding of the liquid styrene at this particular step in the process.

The styrene may be in powder form. It may be added after the curing agents and fillers, etc., have been added to the elastomer. Also the liquid styrene may be added directly to the copolymer or it may be mixed with resins (either thermoplastic or thermosetting as coumarone indene, powdered styrene, or phenol aldehyde types) both fluid or powdered, or with plastics generally used with the mentioned copolymer, before being added thereto. When the mix is completed it is sheeted, cut to shapes and the shaped articles cured by vulcanizing or the like.

While the exact point at which the styrene is added to the synthetic elastomer comprising the copolymer of styrene and butadiene is not of vital importance the feature is that such addition of the styrene imparts to the elastomer the tack necessary for proper processing and which characteristic of tackiness has not heretofore been obtained with such particular elastomer. The tackiness thus imparted makes easy the use of copolymer of styrene and butadiene in the roll mix method of manufacture of abrasive articles and such use of said polymer is difficult when the characteristic of tackiness has not been imparted to the copolymer.

As to the method of utilizing the present invention in the fluid or pressed process of manuture of abrasive articles it is noted that the liquid styrene is used in larger quantities. While powdered styrene may not be used alone in this basic process the liquid styrene used need not be in monomeric form. In this basic method of manufacture the liquid styrene is used to dissolve the synthetic elastomer above specified to form a viscous fluid. This fluid is then mixed with curing agents, resins, fillers, abrasive grain etc. The mix is molded and pressed to the desired shape and the shaped articles cured.

In both of the above basic processes the added styrene is allowed to cure with the specific elastomer and in both processes forms with said elastomer a thermoplastic mix or bond. If desired agents may be added as disclosed in my patent 2,248,031, above mentioned, to form thermosetting bonds. In each case the abrasive article resulting will have uses according to the thermal properties of the bond prepared.

Below I give specific examples of the manner in which the method of the present invention is carried out:

(1) 100 parts of the copolymer of styrenes and butadiene are compounded with 5 parts of monomeric liquid styrene and 50 parts of sulfur. This compound is then used as a bond in the following formula and mixed and processed by the roll process. The cure is similar to that used for rubber compounds.

|  | Ounces |
|---|---|
| Abrasive grain (#60 aluminum oxide) | 16½ |
| Iron oxide | 1 |
| Powdered resin (phenolic aldehyde type) | 1 |
| Bond (above compound) | 2¾ |

(2) 100 parts of the copolymer of styrene and butadiene are compounded with 5 parts of monomeric liquid styrene, 7½ parts of powdered coumarone indene resin, and 50 parts of sulfur. This compound is then used as a bond in the following formula processed by the roll mix method.

|  | Ounces |
|---|---|
| Abrasive grain (#46A aluminum oxide) | 18 |
| Abrasive grain (#90A) | 7½ |
| Powdered resin (phenolic aldehyde type) | 2½ |
| Bond (above compound) | 4¾ |

(3) 500 grams of the copolymer of styrene and butadiene is dissolved in 1250 grams of monomeric liquid styrene to form a viscous mass. Into this mass is mixed 250 grams of sulfur. These materials are then mixed with fillers and abrasive in a dough type mixer. The resultant mix is molded and pressed into the desired shape or shapes and cured in the usual manner. To 75 grams of the viscous mass obtained as above may be added 50 grams of abrasive grain (#90 aluminum oxide).

It will now be understood that by the addition of liquid styrene to the copolymer of styrene and butadiene I am enabled to use such copolymer as the bond in the manufacture of abrasive articles. The liquid styrene is a softener, plasticizer or solvent for the copolymer of butadiene and styrene, depending on the quantities or proportions employed. It imparts to the copolymer the tack so necessary for the processing of the copolymer by the basic roll mix method of abrasive manufacture. Further, it is reacted with the copolymer at some stage in the process of manufacture of the articles by either of the mentioned basic methods of manufacture and preferably such reaction takes place during curing of the shaped abrasive articles.

As the liquid styrene is polymerized it is not necessary that the method of manufacture include any step looking to the removal of the softener, plasticizer or solvent employed. Further when a thermoplastic bond is required in the abrasive articles being made no reactive chemical need be added although such chemical may be added when a thermosetting bond is desired. Thus for that specific synthetic elastomer or copolymer comprising the copolymer of styrene and butadiene I have found that liquid styrene may be used as a softener, plasticizer or solvent and may thereafter be reacted with such copolymer without the addition of any other chemical or the like.

While I have used the word "styrene" throughout this description and in the following claims, I wish it understood that by such term I include substitute styrenes providing substitution is on the benzine ring part of the styrene molecule. Examples of these are methylstyrene chlorostyrene, dimethylstyrene and nitrostyrene. While at elevated temperatures styrene in all stages of polymerization will become liquid (being thermoplastic) the polymerized styrene is nevertheless, less effective for my present purposes as it possesses less solvent power.

Having thus set forth the nature of my invention, what I claim is:

1. The method of making an abrasive article comprising mixing liquid styrene with the synthetic elastomer comprising the copolymer of butadiene and styrene to at least soften the latter, adding curing agents and abrasive grain, shaping articles from said mix, and then curing the shaped article and simultaneously therewith further polymerizing said liquid styrene to form a thermoplastic bond for the abrasive grain in said article.

2. The method of making an abrasive article comprising mixing liquid styrene with the synthetic elastomer comprising the copolymer of butadiene and styrene to at least soften the latter, adding curing agents and abrasive grain, shaping articles from said mix, and then polymerizing said liquid styrene to form a thermoplastic bond for the abrasive grain in said article.

3. The method of making an abrasive article comprising milling liquid styrene into the synthetic elastomer comprising the copolymer of styrene and butadiene whereby to impart the characteristic of tackiness to said copolymer, adding and mixing curing agents and abrasive grain into the copolymer, shaping articles from such mix, and then curing the shaped articles and simultaneously further polymerizing said liquid styrene to form a thermoplastic bond for the grain of said article.

4. The method of making an abrasive article comprising adding liquid styrene to the synthetic elastomer comprising the copolymer of butadiene and styrene to reduce the latter to a viscous fluid, adding curing agents and abrasive grain to such fluid, shaping articles from such mix, and then curing the shaped articles and simultaneously further polymerizing said liquid styrene to form a thermoplastic bond for said abrasive grain.

5. The method of making an abrasive article comprising milling styrene into the synthetic elastomer comprising the copolymer of styrene and butadiene whereby to impart the characteristic of tackiness to said copolymer, adding and mixing curing agents and abrasive grain into the copolymer, shaping articles from such mix, and then curing the shaped articles and simultaneously further polymerizing said styrene to form a thermoplastic bond for the grain of said article.

6. The method of making an abrasive article comprising milling powdered styrene into the synthetic elastomer comprising the copolymer of styrene and butadiene whereby to impart the characteristic of tackiness to said copolymer, adding and mixing curing agents and abrasive grain into the copolymer, shaping articles from such mix, and then curing the shaped articles and simultaneously further polymerizing said powdered styrene to form a thermoplastic bond for the grain of said article.

HUGH V. ALLISON.